(12) United States Patent
Spiecker (10) Patent No.: US 9,705,275 B2
(45) Date of Patent: Jul. 11, 2017

(54) LASER ASSEMBLY (75) Inventor: Heinrich Spiecker, Bielefeld (DE)

(73) Assignee: LAVISION BIOTEC GMBH, Bielefeld (DE)

( * ) Notice: Subject to any disclaimer, the term of this patent is extended or adjusted under 35 U.S.C. 154(b) by 653 days.

(21) Appl. No.: 14/237,455

(22) PCT Filed: Aug. 10, 2012

(86) PCT No.: PCT/EP2012/003431
§ 371 (c)(1),
(2), (4) Date: May 21, 2014

(87) PCT Pub. No.: WO2013/020713
PCT Pub. Date: Feb. 14, 2013

(65) Prior Publication Data
US 2014/0246612 A1 Sep. 4, 2014

(30) Foreign Application Priority Data

Aug. 11, 2011 (DE) .................. 10 2011 109 999

(51) Int. Cl.
H01J 40/14 (2006.01)
H01S 3/00 (2006.01)
G02B 27/14 (2006.01)
G01J 1/08 (2006.01)
(Continued)

(52) U.S. Cl.
CPC .............. *H01S 3/0071* (2013.01); *G01J 1/08* (2013.01); *G01J 1/42* (2013.01); *G02B 27/144* (2013.01);
(Continued)

(58) Field of Classification Search
CPC .. G01J 1/08; G01J 1/42; G02B 27/144; H01S 3/0071; H01S 3/0085
(Continued)

(56) References Cited

U.S. PATENT DOCUMENTS 5,013,660 A * 5/1991 Kasuya ................. C12M 35/02
435/173.5
9,254,222 B2 * 2/2016 Bischoff ................ A61F 9/007
(Continued)

FOREIGN PATENT DOCUMENTS

DE 100 50 540 A1 5/2002
DE 102 15 162 A1 10/2003
(Continued)

OTHER PUBLICATIONS

International Search Report for PCT/EP2012/003431 (3 pgs.).
(Continued)

Primary Examiner — Georgia Y Epps
Assistant Examiner — Kevin Wyatt
(74) Attorney, Agent, or Firm — Flynn, Thiel, Boutell & Tanis, P.C.

(57) ABSTRACT

The invention relates to a laser assembly (100) having a laser (L) for generating primary laser pulses (1), beam splitting optics (15) for splitting a primary laser pulse into a plurality of temporally staggered sub-pulses, and having focusing optics (17-19) for focusing the sub-pulses in or on an object (20) so that every sub-pulse is focused in a separate focus volume (F). The invention is characterized in that the mutual spatial and/or temporal relationship of the focus volumes (F) of the sub-pulses originating from a common primary laser pulse is variably adjustable. The invention also relates to a corresponding method.

22 Claims, 4 Drawing Sheets (51) Int. Cl.
*G01J 1/42* (2006.01)
*G02B 21/00* (2006.01)

(52) U.S. Cl.
CPC ........ *H01S 3/0085* (2013.01); *G02B 21/0076* (2013.01); *G02B 2207/114* (2013.01)

(58) Field of Classification Search
USPC ............... 250/578.1; 359/221.2, 227, 298
See application file for complete search history.

(56) References Cited

U.S. PATENT DOCUMENTS

| | | |
|---|---|---|
| 2009/0011614 A1 | 1/2009 | Bruland et al. |
| 2010/0049055 A1* | 2/2010 | Freudenberg ........ A61B 5/0059 600/475 |
| 2010/0053743 A1 | 3/2010 | Galimberti et al. |

FOREIGN PATENT DOCUMENTS

| | | |
|---|---|---|
| EP | 1 657 579 A1 | 5/2006 |
| WO | WO 2011/052248 A1 | 5/2011 |

OTHER PUBLICATIONS

German Search Report from corresponding German Application No. 10 2011 109 999.2 (5 pgs.).

"Multifocal Multi-Photon Microscopy", by J. Bewersdorf et al, Handbook of Biological Confocal Microscopy, Jan. 2006, pp. 550-560.

"Time multiplexing and parallelization in multifocal multiphoton microscopy", by A. Egner et al, Journal of the Optical Society of America, vol. 17, No. 7, Jul. 2000, pp. 1192-1201.

"Space-multiplexed multifocal nonlinear microscopy", by S. Hell et al, Journal of Microscopy, vol. 202, No. 3, Jun. 2001, pp. 457-463.

* cited by examiner

LASER ASSEMBLY

FIELD OF THE INVENTION

The invention relates to a laser assembly and to a method of use thereof. This laser assembly and the method can be used for example for laser microscopy, in particular for laser-scanning microscopy, or for laser materials processing, in particular for rapid prototyping.

BACKGROUND OF THE INVENTION

In the field of laser-scanning microscopy (confocal microscopy, two-photon microscopy, CARS microscopy, Raman microscopy), the speed and image quality with which data can be recorded depends on the luminous efficacy in the focus of the laser. In particular with dynamic measurements, problems occur due to local photo damage. The image quality depends on the scanning process and the quality of the focus. To achieve optimal resolution, firstly, the sampling (scanning) must be less than half as large as the focus size, secondly, the number of photons per scanning dot contributing to the signal must be large enough so that on the basis of Poisson statistics, sufficiently accurate localization of the observed objects is possible. In practice, a compromise between gentle imaging, measurement speed and resolution must generally be found. With dynamic measurements, in which many images are to be recorded in sequence, it is therefore frequently necessary to select the scanning coarser than the optical resolution.

It is generally not easy to influence the size of the focus itself, because it is given inter alia by the numerical aperture of the illuminating lens. When reducing the numerical aperture by reducing illumination of the lens, the z-resolution along the beam of the microscope in many cases deteriorates significantly. It therefore happens that in many cases images with coarse pixel resolution are scanned with very fine foci, so that the focus volumes between the individual lines do not overlap and large areas of the object can not contribute to image. This underscanning, in addition to the reduced resolution, also results in the fact that a large part of the sample within the image field is not swept by the laser beam and therefore does not contribute to image intensity.

It is not possible to randomly increase the intensity of illumination, and to increase the luminous efficacy from the focus volume at random, since in many cases, in particular with nonlinear microscopy techniques requiring short laser pulses, damage depends highly non-linearly on the irradiated average output of the laser.

The only option to increase the total luminous efficacy is in parallel illumination of different volumes in the object. There is currently no possibility to dynamically adjust the volume scanned to the pixel size of the final image at any time without losing the Z-resolution.

DESCRIPTION OF THE PRIOR ART

To increase the measurement speed, methods are used in laser scanning microscopy where line scans, polygon scans and approaching of point patterns is performed, wherein the information is collected repeatedly along the line or on the individual points. Sampling rates of several hundred up to several hundred thousand Hertz are there to be reached. The individual points within the line scans or approached points are therefore swept very frequently by the laser beam. The problem of whitening and photo damage is thereby increasingly given. On the other hand, such dynamic measurements do not always demand a very small focus volume. For example, in the field of neuroscience, single neurons or somata having a diameter in the range of 10 µm are approached with the laser using two-photon microscopy. In this, the intention is to integrally measure the light intensity from the somata. To keep the local damage in the somata low, e.g. different points within the somatas are approached successively or a line is defined through the somata as the data recording volume, respectively [Gabel W, Kampa B M, Helmchen F.: "Imaging cellular network dynamics in three dimensions using fast 3D laser scanning", Nat Methods 4: 73-79, 2007].

It is therefore desirable for line scanning and point scanning methods to adapt the object volume scanned at a point in time to the morphological structure. The photostability and the luminous efficacy thereby increased would be very interesting for dynamic measurements It would be desirable, for example, for the examination of neurophysiologic processes with voltage-sensitive dyes, if signal changes of less than 1% were locally possible at a sampling rate of several 100 Hz.

If diffraction-limited high-resolution images are generated in laser scanning microscopy, then the resolution can only be obtained when the focus volume limited in diffraction is small, or when the excited volume is imaged on a flat surface detector. In confocal microscopy, both principles are used simultaneously in that a small focus volume is imaged onto a pinhole, and the excitation point function and the detection point function are thereby superimposed. This method can be refined by placing a small flat surface detector in place of the pinhole. Confocal microscopy and also confocal microscopy using a so-called flat descanned detector only makes sense if the sample is sufficiently transparent and imaging on the detector succeeds without errors. In this case, scattering of the light generated harms allocation on the flat surface detector, leading to loss of light in confocal microscopy.

Nowadays, laser scanners are also used for materials processing with ultra-short pulse lasers. Alternatively, the workpiece can be moved. The use of ultra-short pulse lasers has the advantage that material removal occurs instantaneously and thermal damage can in the vicinity of the working area be largely avoided. Ever-increasing performance is used to increase the processing speed. In this, in addition to the instantaneous removal by the laser pulse, thermal damage to the workpiece increasingly occurs, which leads to the reduction of removal quality.

The laser beam locally impinging in a focused manner generates plasma in which free electrons are increasingly present. They are excited to oscillate by the electric field of the laser and at high electron densities in hot plasmas act as a mirror for the exciting laser, whereby additional energy input into the plasma by the laser is impossible. These effects (mirage effect) make it necessary to distribute the light over a larger area when resorting to higher laser powers. The present invention relates to such splitting, where the distribution of the laser to different points is designed such that these points also can overlap, because the laser pulses do not simultaneously impinge on the material to be processed.

Short-pulse lasers are also used for rapid prototyping methods and for the production of micro-components. In this, the focused laser is irradiated into a liquid hardened by light. In order to be able to create particularly small structures limited in all dimensions, liquids are used that can be hardened by multiple photon processes. The structure is created either by scanning the laser beam or by a movement of the object holder. The processing speed is usually not limited by the available laser power, but by the scanning speed when creating the structure.

A beam splitter is known from DE 199 04 592 A1 which splits a laser beam in a line or an array of different beams. This splitting is fixed temporally and spatially and can not be adapted. The splitting is done by a central beam splitter, to which the light is repeatedly reflected by pairs of mirrors. The splitting is caused by different angles between the mirrors and the central splitter. Since the laser beams must be combined in the entrance pupil of a lens to produce foci, one of the requirements is that the spacings of the pairs of mirrors to the central splitter are chosen such that the beam axes intersect at one point. The different spacings of the pairs of mirrors to the central splitter have also to ensure the function that the beamlets do not reach the sample at the same time. This characteristic of the bundle of beams referred to as time-multiplexing is essential for multi-photon microscopy, as any interference of the waves of different beamlets would lead to loss of z-resolution. Any variabilization of the pattern of the foci is not possible with the beam splitter described in DE 199 04 592. If the pattern is to be small, then the characteristic of multiplexing would be lost because the temporal intervals between the illumination of the individual foci would then become small and the beamlets begin to temporally overlap.

A generic laser array with a beam splitter is known from U.S. 2009/0067458 which, however, causes a purely temporal splitting of the laser pulses. All beamlets impinge upon a common point in the sample. The characteristic of multiplexing is in this case achieved in that the volume between the pairs of mirrors and the central splitter is filled by different glasses having different dispersions and thus delay the beamlets differently. The splitting is in this array not variable due to the fixed mounting of the elements.

WO 2011/052248A1 discloses a beam-splitting apparatus generating a plurality of pulsed beams illuminating an object, where delays between the individual beams are generated so that the response of the object to the beams can be temporally separated. The invention satisfies the objective to enable particularly fast scanning methods, where the sub-pulses generated by the beam splitter are always detected separately. The splitting is performed in that the temporal delay of the individual sub-pulses is so high that the detector is able to temporally separate the response of the sub-pulses. The method is geared towards a laser scanning microscope, in particular to a fluorescence microscope, where the fluorescences have typical fluorescence lifetimes of up to several nanoseconds. The object of the invention is therefore that the temporal delays are so high that the fluorescences generated as a response to the pulses are generated in a temporal spacing of several nanoseconds. It is therefore necessary to have path length differences be large. Another requirement that quick scanning poses to the apparatus described in WO 2011/052248A1 is that the beams are to be guided to different points within the object, this is done by adjusting either the angle between the beams or offsetting the beams. The combination of the large temporal offset and the angles makes it necessary to use elaborate optics which ensure that the final focusing optics is impinged upon centrally by all the beamlets. A series of relays are used for this purpose in the application.

US 2010/0053743A1 describes an apparatus for a real-time three-dimensional laser scanning microscopy method for single and multi-photon fluorescence microscopy. The real-time capability of the apparatus is ensured by the fact that a beam splitter is used that illuminates different points, namely, also in different focusing planes, each with a temporal delay. The method also aims to temporally and spatially split the signals from the different points from each other and to obtain separate image information from each of the individual focus volumes. Splitting is performed, firstly, by a descanning method on a multi-channel detector, and secondly, by temporal demultiplexing using a fast detector and the delays between the individual pulses.

Furthermore, WO 2009/035768 describes an illumination method using passive pulse splitters and DE 100 50 540 A1 describes a method for laser scanning microscopy in which a set of laser pulses is generated in focus volumes disposed adjacently in a plane in order cause fluorescence radiation from a sample along a line or along a surface.

OBJECT OF THE INVENTION

The object of the present invention is to improve known laser assemblies and methods as simply as possible to the extent that higher resolutions arise regarding the use in the field of microscopy, preferably, with a lower-noise signal and/or with less damage to the sample, or that more accurate and faster processing with less damage to an object results during application in the field of materials processing.

SUMMARY OF THE INVENTION

In the laser assembly according to the invention, primary laser radiation or primary laser pulses, respectively, are split by beam splitting optics into a series of beamlets, secondary pulses, or sub-pulses, respectively. In contrast to conventional laser assemblies with a fixed distribution of individual focus volumes of the secondary laser pulses in the sample or in the object, the invention provides that the mutual spatial and/or temporal relationship of the focus volumes of the secondary pulses or sub-pulses originating from the common primary laser pulse is variably adjustable. On the illuminated object or within the object, the focused sub-pulses can interact with the object independently of each other. In this regard, the invention enables offsetting the focus volumes of adjacent sub-pulses either spatially or temporally sufficiently far from each other that no undesirable interaction such as interferences between the focus volumes can occur. On the other hand, however, the focus volumes can as needed also be placed so closely together that illuminating as entirely as possible of a partial region of the object arises. Overall, the laser assembly according to the invention has the advantage that it is extremely flexible in terms of illuminating the object or a partial region of the object.

According to the invention, the temporal difference between the arrival of different sub-pulses at their respective foci is at most 3 nanoseconds. This is achieved in that the optical path lengths (i.e., the integration of the geometric path length multiplied by the refractive index) of the beam paths traveled by the individual sub-pulses differ from each other by an amount which, divided by the speed of light, corresponds to the temporal difference of 3 nanoseconds. It is also conceivable that the maximum temporal difference is even shorter, for example, less than 2 nanoseconds, or even less than one nanosecond. With application in the area of microscopy, it can thereby be achieved that, for example, illumination of the foci of all sub-pulses is within the fluorescence lifetime of the material of the sample. It has proven to be particularly suitable for various applications, if splitting of the primary laser pulse into sub-pulses occurs without loss or at least with as little loss as possible and if the beam power in all beamlets or the energy in all sub-pulses is approximately equal in size.

It is further advantageous if all beamlets can be focused with only a single optics into the object. This can be realized in that the beamlets nearly centrally meet the entrance pupil of a scanner or a microscope objective. This characteristic is ensured particularly well if the beam axes of the individual beamlets with respect to the beam diameter of the beamlets are offset by max. 10% vis-à-vis the center of the entrance pupil. In one example, an offset in the entrance pupil by 400 microns would be acceptable at a beam diameter of 4 mm.

The mutual spatial relationship of the focus volumes of the sub-pulses originating from a common primary laser pulse can preferably be adjusted such that the focus volumes connect or overlap at least partially. As already illustrated, this can result in complete or at least substantially complete illumination of a given region of the sample.

Depending on the application, it can be advantageous if the focus volumes of the sub-pulses originating from a common primary laser pulse are disposed in a common plane or in a common three-dimensional volume element (voxel). The dimensions of the illuminated region of the plane or the dimensions of the region of the voxel to be illuminated are preferably predeterminable in order to adjust the assembly and the spatial relationship of the focus volumes to these predetermined dimensions. Such an adjustment was impossible with conventional laser assemblies.

In another application, it could be advantageous if the focus volumes of the sub-pulses originating from a common primary laser pulse are adjustable such that the secondary or sub-pulses, respectively, are focused to a common focus volume. This has the advantage that the common focus volume receives the entire radiation of the primary laser pulse. However, possibly undesirable side effects, in particular of a non-linear type can at the same time be avoided in that the individual sub-pulses arrive in a temporally staggered manner in the common focus volume.

Handling of the laser assembly according to the invention can be particularly easy in that an adjustment device is provided for adjusting the mutual spatial and/or temporal relationship of the focus volumes of the sub-pulses originating from a common primary laser pulse. This adjustment device can also be adapted to automatically adjust the temporal and/or spatial relationship of the individual focus volumes.

In the interest of an optical configuration as simple as possible, it is advantageous if the adjustment device is associated with the beam-splitting optics.

The adjustment device preferably comprises at least one first degree of freedom to adjust the spatial relationship of a first sub-pulse to a second sub-pulse, in order to thereby define a group of focus volumes of two sub-pulses. The advantages of the present invention can already be achieved with this comparatively simple configuration.

It is even better, however, if the adjustment device has at least one further degree of freedom to adjust the spatial relationship of the group of focus volumes defined with the previous degree or degrees of freedom to form a further group of focus volumes of sub-pulses. This enables, for example, generating a two- or three-dimensional field of sub-pulses to thereby illuminate a predetermined partial region of the object.

To effect adjustment of the spatial and/or temporal relationship of the individual focus volumes of the sub-pulses, the adjustment device can comprise, for example, at least one piezoelectric actuator.

It is advantageous if a controllable shutter is provided in at least one optical path of a sub-pulse. The path of the beam can be interrupted with the shutter to adjust the optical paths of other sub-pulses independent of this optical path. It is particularly advantageous if a respective separately controllable shutter is provided in the optical paths of all sub-pulses (except for possibly one single sub-pulse) so that the path of each sub-pulse can be adjusted independently of the other sub-pulses. This considerably facilitates adjustment of the laser assembly according to the invention.

In one embodiment of the invention, a pilot laser beam is provided, preferably a continuous wave pilot laser beam that can be coupled into the beam splitting optics on an optical axis that is substantially identical with an optical axis of the primary laser pulses. This pilot laser beam can have a wavelength at which the human eye is highly sensitive. It can be thereby be used to set and adjust the laser assembly according to the invention, in particular to adjust the location of the individual focus volumes in the object. The pilot laser can in particular be a He—Ne laser or a frequency-multiplied semiconductor laser.

It may also be advantageous to provide a beam splitter and imaging optics for imaging the spatial distribution of a group of sub-pulse originating from a common primary laser pulse on a flat surface detector. In this manner, the spatial relationship of the focus volumes of the individual sub-pulses can be controlled and adjustment of the laser assembly can be simplified. If the position of the sub-pulses is adjusted and checked using a flat surface detector, then the wavelength of the pilot laser can be selected such that it is located on the edge or outside of the spectral range in which the beam splitter is to be operated. It can thereby be ensured that adjustment can also be checked even during operation.

This flat surface detector (viz. two-dimensional detector) could, for example, be a CCD camera or a CMOS camera.

In a further variant of the invention, a scanning device can be provided with which a predetermined region of the object is scanable by groups of focus volumes of sub-pulses. This makes it possible to sequentially illuminate large areas of the object or even the entire object to obtain information from all illuminated regions of the object or to process all illuminated regions of the object, depending on the application.

The invention also relates to a method that provides that the size of a two-dimensional region (pixel) or a three-dimensional region (volume element or voxel, respectively) is predefined on or in the object, and that the spatial and/or temporal relationship of the focus volumes of the individual sub-pulses is adjusted preferably variable (possibly in an automated manner) such that this predefined region of the object is optimally illuminated. It is particularly advantageous if also the size of individual focus volumes is variably adjustable as a further parameter.

During the scanning process when generating an image composed of the image pixels, the laser beam or the individual beamlets, respectively, sweep the sample preferably in a scanning process. The signal created during the so-called dwell time is associated with one pixel. During this dwell time (synonymously for pixel integration time), the focus of the laser sweeps over the object region associated with the pixel. The object region can in the case of scanning microscopy be in the range from 100 nanometers up to several micrometers. Typically, the diameter of a laser focus is in the sub-micron range, so that for a pixel size of, for example, 2 micrometers, the swept area has a size of 2×0.3 micrometers when the focus diameter is at 0.3 micrometers.

The pixel is thereby illuminated only on a line and not over its entire surface area of 2×2 micrometers. Uniform illumination of the pixel in the above example can be created when, for example, 8 beams each having a beam diameter of 0.3 micrometers can be arranged adjacently such that a short line with the length of 2 micrometers is formed which is perpendicular to the scanning direction. If the point-spread functions of all beams over the dwell time are always integrated, then the result is a dwell-time-integrated overall point-spread function. The point-spread function thus calculated has a residual ripple that is up to a pixel size of 2 micrometers less than 20%, depending on the numerical aperture of the objective, the wave length and the wave length of the exciting laser. Such a residual ripple of less than 20% is, within the meaning of the invention, referred to as "uniform illumination" of an object region or of a pixel, respectively. The lower the numerical aperture is, the larger the pixels that can be illuminated with a residual ripple of less than 20%. If the beam pattern is defined in the above manner, then the entire area associated with the image is almost uniformly illuminated, because when running through the next column of pixels, the line that is generated by the beam splitter seamlessly connects to the line of the preceding row.

Finally, the invention also relates to the use of the laser assembly according to the invention or the method according to the invention either in microscopy—for example, in laser or laser scanning microscopy—or in the field of materials processing, there in particular for rapid prototyping.

With the invention, it is possible to variably adjust the focus positions in one, two or even three dimensions. In the case of using the laser assembly in a laser scanning microscope, it is additionally possible to adapt the beam pattern or the pattern of the focus positions dynamically to the scanning mode of the microscope. In this, it is possible to substantially completely sweep an area of the sample or of the object corresponding to a scanning dot (pixel or voxel) with the beams of the beam pattern. When applying the invention in the field of materials processing, in particular for rapid prototyping, the laser assembly according to the invention allows dynamic adaptation of the region of the object illuminated by the group of focus volumes of sub-pulses to the structure to be processed or to be produced using rapid prototyping.

In another aspect, the invention provides for splitting a primary laser beam and recombining it, where there is at least one controllable adjustable element present in the path between the separation and recombination and the two optical path lengths between the primary separation and the recombination are not equal in length so that the split laser beams impinge the point of recombination at different points in time. The splitting of the laser beam and the recombination can according to the assembly of the invention repeat itself several times, where the recombination point can also again be a new sub-point, so that splitting into two, four, eight or sixteen or more sub-pulses or beamlets is possible. In a microscopy application, the beam splitting device can be combined with a laser, a laser scanner and a microscope, where the different beamlets are focused at different points of the sample and the light emitted from the sample is collected on a detector. Due to the adaptability of the angle between the beamlets, it is possible to generate a dot pattern, the size of which is adapted to the object to be examined or to the pixel size in the image to be generated, respectively. One feature of the assembly is that the angles inserted between the beamlets can also be very small, so that the pattern of the foci produced in or on the sample is freely definable.

BRIEF DESCRIPTION OF THE DRAWINGS

In the following, an advantageous embodiment of the invention is further illustrated using a drawing. Specifically.

Similar components are throughout the figures designated with the same reference numerals.

DETAILED DESCRIPTION OF THE INVENTION

Figure 1:
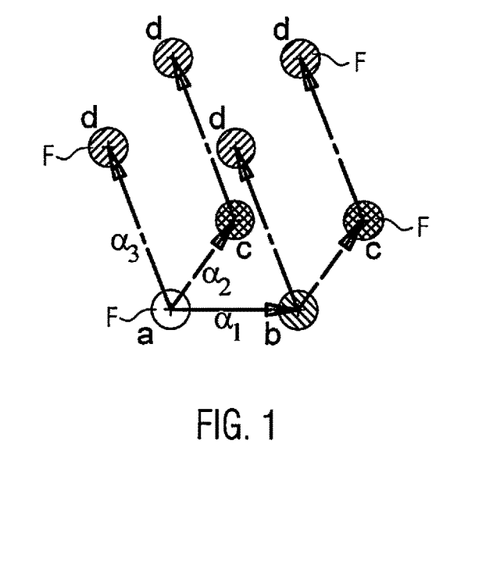
FIG. 1 shows a schematic representation of the spatial relationship of the focus volumes of individual sub-pulses.

FIG. 1 shows the general splitting of the beams and the location of the foci F or the focus volumes of several sub-pulses, respectively. A central beam creates a focus (a) in the sample. With a first and second splitting of the beam, a second beam is formed which creates a focus (b) in the sample. The location of the focus is created by a controllable mirror in the beam path between the splittings that inserts an angle $\alpha_1$ between the beams and thus a distance between the foci F in the sample. Between the second splitting of the two beams then into four beams (a, b, c, c) and a third splitting, a second controllable mirror creates an angle $\alpha_2$ which leads to two new foci (c). Between the third splitting into 8 beams (a, b, c, c, d, d, d, d) and a recombination of the beams, e.g. in a polarization beam splitter prism, a third controllable mirror is inserted creating an angle $\alpha_3$ and thereby four new foci (d). All patterns are now possible that can be created by selection or random combination of the angles $\alpha_1$, $\alpha_2$, $\alpha_3$.

Figure 2:
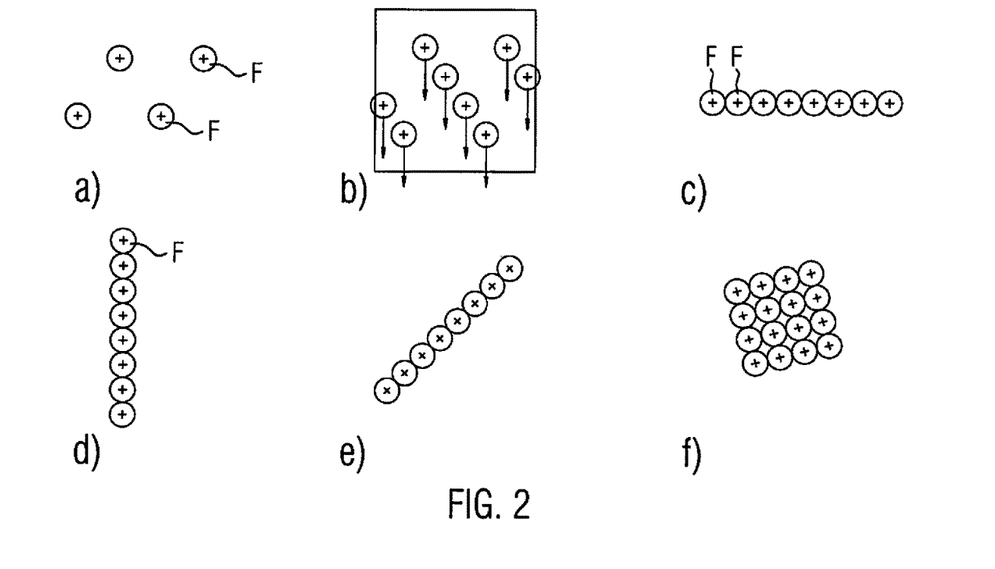
FIGS. 2a to 2f show examples of different assemblies of a group of focus volumes of sub-pulses.

FIG. 2 shows possible arrangements of the focus pattern, where FIG. 2a illustrates the splitting into four foci in the form of a parallelogram. FIG. 2b shows the splitting into eight beams, where the beams are arranged such that the beams or focus volumes, respectively, sweep equidistance lines during a scan process along the indicated arrow direction. The square shown illustrates one possible pixel area which is illuminated substantially uniformly on or in the sample or object when scanning the focus pattern. FIGS. 2c to 2e show the arrangement of the foci F as lines having different orientations. This arrangement can be used in combination with camera detection for fast scanning of large surfaces. It may be useful to create even more than 8 beams, e.g. 16, 32 or 64 beams. FIG. 2f finally shows a variant in which a field is formed of 4×4 foci or focus volumes F, in which the individual focus volumes connect with each other and overall achieve almost total illumination of a square pixel region. The angles $\alpha_1$, $\alpha_2$ and $\alpha_3$ shown in FIG. 1 are normally not coplanar with each other. If during adjustment of the pattern to a pixel, the beam diameter and thereby the numerical aperture is additionally changed, then the z-resolution can be adapted to a three-dimensional volume region, i.e. a so-called voxel, and thereby illuminate the latter uniformly.

Figure 3:
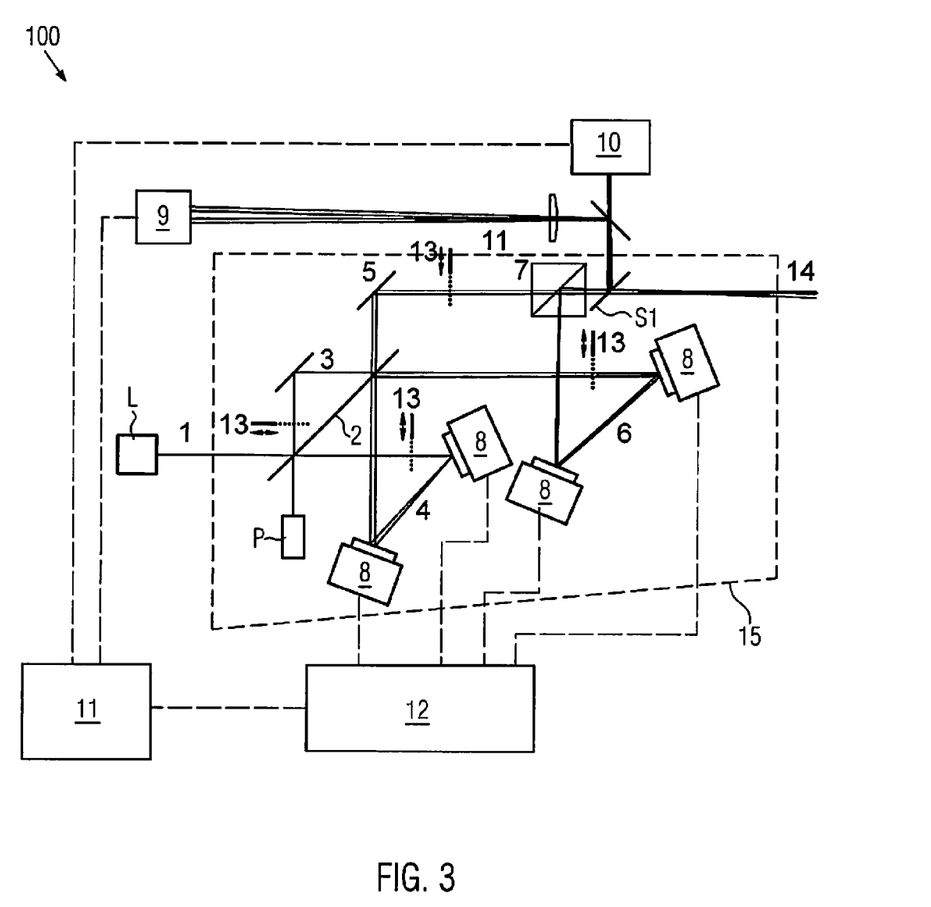
FIG. 3 shows a schematic representation of a region of an embodiment of a laser assembly according to the invention.

FIG. 3 shows an embodiment of a laser assembly 100 according to the invention, where a pulsed primary laser beam 1 from a laser L impinges a beam splitter 2, is split there and via two different optical paths 3 and 4 again returns to the beam splitter 2 where the two beamlets are again split and a total of four beams each with one sub-pulse is created which are guided in pairs via different paths 5, 6. In the embodiment according to FIG. 3, the beams are then again combined in a polarization coupler 7. It is therefore advantageous to rotate the polarization of the beams in one of the two beam paths 5 or 6 by 90°. From the polarization coupler 7, the bundle of beams 14 reaches the output of the beam splitting optics 15 and is then available for further use.

There are two controllable mirrors 8 in the beam paths 4 and 6 with which the beamlets can be deflected and offset. Some of the beams can in the assembly be coupled out to a beam splitter 51 and focused onto a flat surface detector 9 so that the beam angle is detectable. A second flat surface detector or a position-sensitive detector or a quadrant photodiode or a position-sensitive detector 10 can be used to check the beam position of the individual beamlets. An evaluation unit 11 is provided to change the setting of the mirrors 8 by use of actuating electronics 12 such that the beam pattern assumes the desired shape. For better evaluation of the specimen on the flat surface detector 9, 10, controllable shutters or beam shutters 13 are provided with which the beamlets can be faded down in order to thereby sequentially check and adjust the precise position of the individual foci F. The second detector 10 is best placed such that it is located in a plane conjugated to the entrance aperture of the following focusing optics.

Ultimately a bundle 14 of beamlets of the primary laser beam 1 leaves the beam splitting optics 15 of the laser assembly 100. This beam splitting optics 15 is composed of the individual beam splitters 2, 7 and the mirrors 5, 8 provided therebetween. In the bundle of beams 14, the beamlets have a small angular offset to each other. In addition, the secondary or sub-pulses traveling on the individual beamlets can have an adjustable temporal offset from each other. The spatial angle of each of the beamlets (four beamlets in the assembly illustrated) is adjustable in two different directions. All beamlets reach the object or the sample 20 via a scanning device 16 (see FIG. 4), for example, a scan mirror, and can there be arranged in the shape of any parallelogram or along a line. Alternatively to using a scanning mirror or pair of scanning mirrors, the sample can also be moved on a translational device.

The beam from a pilot laser P can be coupled into the beam splitting optics 15 using the beam splitter 2—namely such that the beam of the pilot laser P and the beam of the laser L travel on the same or at least almost the same optical axis. The beams are then both split and follow identical or nearly identical paths, without there being the need for installing additional optics.

Figure 4:
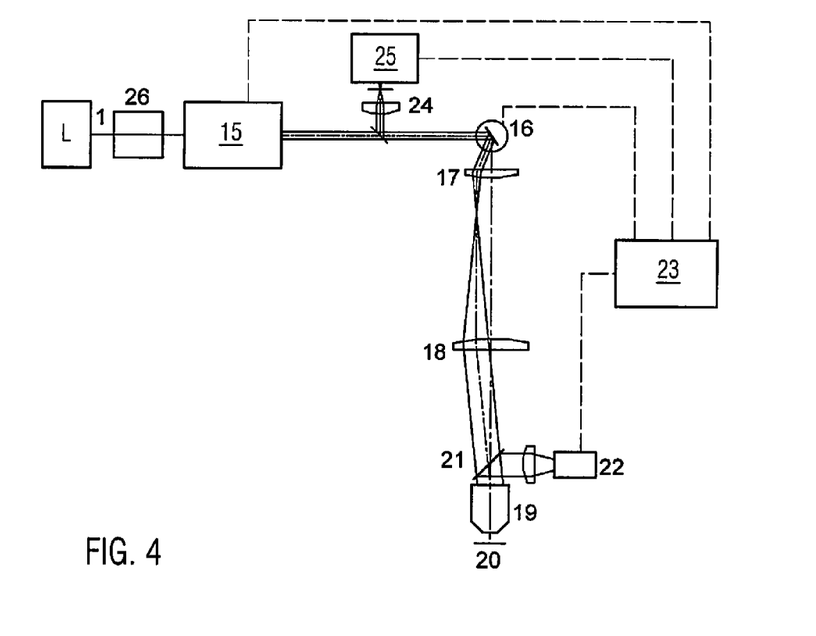
FIG. 4 shows a schematic representation of a second region of the laser assembly.

FIG. 4 schematically shows an embodiment of a scanning microscope, where one or more lasers L generate a laser beam 1 which is, in the beam splitting optics 15, split into a bundle of beams. It reaches a scanner 16, which is either a polygon scanner, a galvanometric resonant or non-resonant scanner, an acousto-optical scanner (AOD) or a combination thereof. The laser light is focused into a sample 20 by use of this scanner 16, transfer optics 17, 18 and a lens 19. That light emitted there is directed either by a dichroite 21 onto a "non-descanned" detector 22 or imaged "descanned" onto a flat surface detector 25 using imaging optics 24. A control unit (computer) 12, 23 records the data of the detectors 22, 25 and can display the images. It can be useful to install a variable telescope 26 between the laser 14 and the beam splitting optics 15 with which the beam diameter of the laser beam 1 can be adjusted. The size of the individual focus volumes F of all sub-pulses can be varied simultaneously with the telescope 26.

Figure 5:
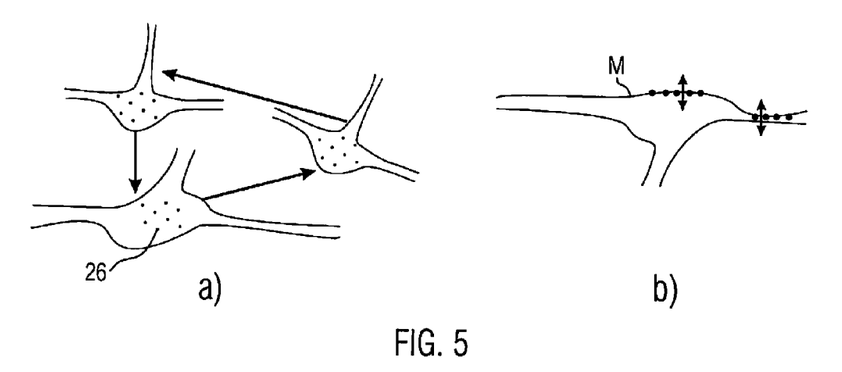
FIGS. 5a, 5b show a schematic representation of an application of the laser assembly according to the invention

FIG. 5 schematically shows the illumination of microscopic objects using the focus pattern, where in FIG. 5a, for example, eight beams illuminate e.g. a somata of a cell. The foci 26 of the beams are shown as dots.

Illumination with a line, as shown in FIG. 5b, can also be used to quasi-simultaneously illuminate line-like structures, for example, sections of a membrane M in order to scan these sections quickly. In this, it is particularly interesting to excite voltage-sensitive dyes in the membrane M in order to highly accurately be able to determine membrane potentials at a high sampling rate. The arrows in the figure indicate a scanning process, so that the membrane M is repeatedly swept over. Not shown is a variant of the scanning process in which the foci are arranged such that they in the event of a scanning process do not simultaneously sweep over the membrane. In combination with a fast detector, entire sections of a line-like object (membrane M or even dendrites) can then be rapidly scanned with very short scan paths and be illustrated at least at the intersections of the beam paths with the object. It may be useful to create a line of foci and to scan across the object at an angle to the line-like object.

In a further embodiment not shown, splitting of the laser beam 1 can be performed in individual beam splitters 2 so that the split beams do not again need to be directed to the splitter by which they were split. It is also useful if more than one or two mirrors are provided between the splitting points. The assembly with individual beam splitters can also be selected such that no mirror is present in one of the two beam paths. It is in particular useful if either an even or an odd number of mirrors 3, 5, 8 is provided between the splitting points in each of the two beamlets or bundles of beams, where the use of no mirror, i.e. the direct path between one splitter and the next is to be considered as being an even number of mirrors. This ensures that the output bundle of beams 14 is with an offset or a change of angle of the input laser beam moved or tilted in a common direction and not in an opposite direction. The beam pattern within itself is in this case maintained and moves only as a whole and the output beams are tilted as a whole in one direction.

It can also be useful to image the output bundle of beams from a virtual plane within the beam splitter 2, 7 by (e.g. telecentric) imaging onto a point located outside of the beam splitter. This point is preferably located in the vicinity of the entrance aperture of the following focusing optics or on the scanner 16, which in turn is imaged on the entrance aperture of the focusing optics 19, see FIG. 4. Imaging is preferably formed in a telecentric manner, so that the beams again run in a parallel after imaging. The lenses necessary for this would be arranged, according to the example of the embodiment in FIG. 4, between the beam splitting optics 15 and the scanner 16. This procedure has the advantage that when setting and altering the beam pattern, little beam offset occurs at the point outside of the beam splitter and the beams of the focusing optics 17, 18 largely impinge centrally. If expansion of the beam pattern is sufficiently restricted, the use two controllable mirrors 8 between the splitting points can be dispensed with. In addition, measuring the beam position in the detector 10 can possibly be dispensed with.

In particular, a suitable compromise between the temporal offset of the beamlets and the possible maximum size of the beam pattern can be found. This can be less than 1 ps but also several ns, depending on the application.

Figure 6:
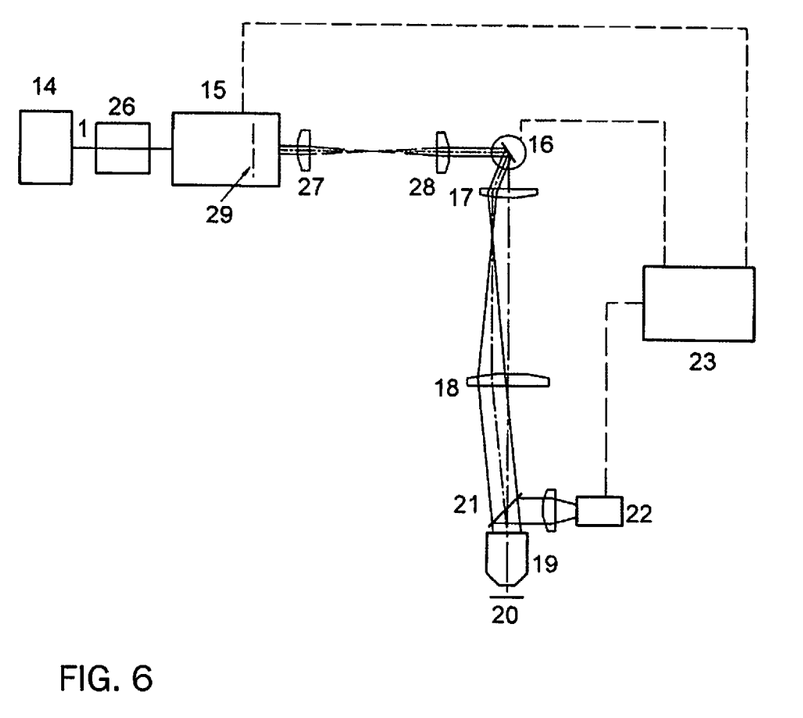
FIG. 6 shows a laser assembly as in FIG. 4 with additional relay optics.

A possible arrangement of relay optics is shown in FIG. 6. A virtual plane 29 located in the beam splitter 15 is there illustrated by a pair of relay lenses 27 and 28 on the scanner 16. The beams that leave the beam splitter 15 as collimated beams have an angle to each other. This angle is obtained by the imaging to the scanner 16 through the lenses 27 and 28, where the property of the collimation is also obtained by the telecentricity of the imaging. If the beam splitter 15 creates beam offset of the individual bundles of beams in the virtual plane 29, then this beam offset is also imaged onto the scanner, but not further enlarged by the angularity between the individual beamlets. If one does not select too large a value for the temporal offset between the individual beamlets, e.g. of a total of max. 3 nanoseconds, then it is possible to keep the beam offset of the individual beamlets on the scanner at an angularity of several millirad (mrad) between the sub-beams to be smaller than 10% of the beam diameter itself.

In the application in microscopy, in particular in living organisms, it can in the scanning process be ensured with the variable pattern of the foci that the surface being associated with a pixel is uniformly illuminated or swept over by the foci of the pattern. The variability of the pattern allows adaptation to the size of the pixels in dependency of the scanning mode It is also advantageous if adaptation to the pixel size, i.e. the scanning mode, is done automatically so that even with changing scanning modes, the sample is at all times scanned uniformly and thus in a gentle manner. If the sample 20 is scanned three-dimensionally, then the scanning volume can be increased by selection of the illumination of the lens 19, so that the volume being associated with a pixel in the three-dimensional image stack (voxel) is illuminated. This can be done by adjusting the variable telescope 26. This method ensures that the sample 20 is evenly loaded during the scanning process and that there is reduced local damage. Here as well, it is advantageous if adaptation of the excitation aperture by illumination of the lens to the three-dimensional scanning process occurs automatically, where the distance between the planes to be recorded also needs to be considered.

The above-mentioned procedures are particularly advantageous when damage depends to a high power on the local temporary light output density.

In one possible application of the beam splitter, the light generated in a sample by the beam pattern is detected by a time-resolved detector 22, 25. If beams then impinge within a sufficiently short temporal interval on the sample 20, then the temporal response of the sample 20 can be used for the purposes of an FLIM analysis. The beam splitting optics 15 according to the invention can with moderate temporal multiplexing in the range until a total of about 3 ns still be considered as being pulsed excitation, where typical fluorescence lifetimes in the range between 500 ps and 5 ns still remain measurable.

If, however, distribution of the pulses is temporally distributed to the extent that the individual pulses can be resolved by the detector 22, 25, then it is possible to draw conclusions with the detector 22, 25 from the temporal structure of the response of the sample 20 regarding the density distribution of the molecules excited by the light within the beam pattern. If this functionality is used together with a scanning process, then the signal can be used for faster generation of a high-resolution image. Under appropriate conditions, both location information as well as fluorescence lifetime can be measured in the distribution across the beam pattern.

The present invention also relates to the question of how one can in the event of diffraction-limited image recording achieve gentle excitation in several foci without losing resolution. In this, the excitation is in several image points with a known excitation point pattern combined with deconvolution or iterative reconstruction methods, so that an image results as would be created with a single beam. This is particularly advantageous when the data is processed and displayed in a fast computer 23 that determines additional information on the geometry of the beam pattern either using auto-correlation from the image or uses the information of the detector 9 as a deployment core.

In the assembly according to the invention, pulse lasers L are usually employed that have a pulse repetition rate in the range of, for example, 20 to 100 MHz, in particular 80 MHz (titanium-sapphire lasers or optical parametric oscillators). The beam splitting provides for a temporal delay between the beams, so that no two beams pass through the sample 20 at the same time. This is advantageous, since the cone of beams penetrating another above and below the focus F is not irradiated simultaneously and therefore no interference occurs, even with different focus positions.

Multiplexing is in the present invention preferably achieved in that at least one of the two bundles of beams 14 generated is between two sub-points either directed via more than one mirror 5, 8 to the next sub-point or that there is an odd number of mirrors between the sub-points in both beam paths. Different optical paths 3, 4 being generated by different refractive indices in the beam paths have the drawback that the laser radiation is then also subject to a different chirp due to the dispersion.

The temporal structure of illuminating the individual focus volumes can be changed in particular in that the different groups of sub-pulses are selectively faded up or down. This can be done by use of the controllable shutter 13.

In particular in materials science applications, in laser processing and in rapid prototyping, the scanner 16 can be omitted and replaced by a scanning sample table. The sample table can carry a liquid curable by two- or multi-photon processes. The beam pattern can then be used to rapidly create three-dimensional structures at good reproduction quality. In this, the table can be moved using motorized actuators such that the pattern of foci is adapted to the structure to be created. Different regions of the sample can be illuminated with different patterns. Quick readjustment using the piezoelectric mirrors 8 is then advantageous For rapid prototyping, an inverted microscope can advantageously be used.

The present invention makes it possible in rapid prototyping to variably adjust the volume creating the structure so that the time necessary for the production of the component can be reduced. In this manner, massive parts of a component can be created faster with fewer scans. By adjusting a focus pattern, it is also possible to quickly create replicas of a component or a sub-unit of a component. For example, grid structures and random structures, such as basic cells in the shape of rectangles and parallelograms can be created very quickly. Such structures are used, for example, as photonic crystals, three-dimensional matrices for cell cultures and tissue engineering, micro-mechanical and micro-optical components and in micro-electromechanical systems (MEMS) as sensors and actuators.

The invention claimed is:

1. A laser assembly (100) having a laser (L) for generating primary laser pulses (1), beam splitting optics (15) for splitting a primary laser pulse into a plurality of temporally staggered sub-pulses, and focusing optics (17, 18) for focusing said sub-pulses in or on an object (20) such that every sub-pulse is focused in a separate focus volume (F) characterized in that the mutual spatial and/or temporal relationship of said focus volumes (F) of said sub-pulses originating from a common primary laser pulse is variably adjustable, the optical path lengths of the beam paths (3, 4, 5, 6) traveled by said individual sub-pulses at most differ from each other such that the temporal difference between the arrival of different sub-pulses at their respective foci (F) amounts to a maximum of 3 nanoseconds, an adjustment device (12, 8) is provided for adjusting said mutual spatial and/or temporal relationship of said focus volumes (F) of said sub-pulses originating from a common primary laser pulse and the adjustment device (8, 12) comprises at least one first degree of freedom to adjust said spatial relationship of a first sub-pulse to a second sub-pulse, in order to thereby determine a group of focus volumes (F) of two sub-pulses.

2. The laser assembly according to claim 1, characterized in that said mutual spatial relationship of said focus volumes (F) of said sub-pulses originating from a common primary laser pulse can be adjusted such that said focus volumes (F) connect or overlap at least partially.

3. The laser assembly according to claim 1, characterized in that said focus volumes (F) of said sub-pulses originating from a common primary laser pulse are arranged in a common plane or in a common three-dimensional volume element.

4. The laser assembly according to claim 1, characterized in that that said focus volumes (F) of said sub-pulses originating from a common primary laser pulse are adjustable such that said sub-pulse originating from a common primary laser pulse are focused in a common focus volume (F).

5. The laser assembly according to claim 1, characterized in that said adjustment device (8, 12) is associated with said beam splitting optics (15).

6. The laser assembly according to claim 1, characterized in that said adjustment device (8, 12) comprises at least one further degree of freedom to adjust said spatial relationship of said group of focus volumes (F) defined with said previous degree or degrees of freedom to a further group of focus volumes of sub-pulses.

7. The laser assembly according to claim 1, characterized in that said adjustment device comprises at least one piezo-electric actuator.

8. The laser assembly according to claim 7, wherein the at least one piezo-electric actuator is provided at a controllable mirror (11).

9. The laser assembly according to claim 1, characterized in that a controllable shutter (13) is provided in at least one optical path of a sub-pulse.

10. The laser assembly according to claim 1, characterized in that a pilot laser beam (P) can be coupled into said beam splitting optics (15) on an optical axis that is substantially identical with an optical axis of said primary laser pulses.

11. The laser assembly according to claim 10, wherein the pilot laser beam (P) is a continuous-wave pilot laser beam.

12. The laser assembly according to claim 1, characterized in that a two-dimensional detector (9, 10) is provided onto which said spatial distribution of a group of sub-pulse originating from a common primary laser pulse is imaged.

13. The laser assembly according to claim 12, characterized in that said two-dimensional detector (9, 10) is a CCD camera or an MOS camera.

14. The laser assembly according to claim 1, characterized in that a scanning device (16) is provided with which a predetermined region of said object (20) is scanable by groups of focus volumes (F) of sub-pulses.

15. The laser assembly according to claim 1, characterized in that either an even number or an odd number of mirrors (3, 5, 8) is respectively provided within the beam splitting optics (15) in all different beam paths (3, 4, 5, 6) between a beam splitter (2) and the subsequent recombination point (2, 7) for beamlets split at said beam splitter (2).

16. The laser assembly according to claim 1, characterized in that imaging optics (27, 28) are provided which are arranged such that an output bundle of beams of sub-pulses is from a virtual plane within said beam splitting optics (15) imaged onto a point which is located on said scanning device (16) or an entrance aperture of said focusing optics (17, 18).

17. A method for illuminating a region of an object (20) by focused laser radiation, comprising the step of providing the laser radiation initially in the form of primary laser pulses (1) which are split by use of beam splitting optics (15) into a plurality of temporally staggered sub-pulses, wherein each of said sub-pulses is focused in a separate focus volume (F) in or on said object using focusing optics (17, 18, 19), characterized in that the size of a two-dimensional or three-dimensional region to be illuminated within or on said object is determined variably and, depending thereupon, said mutual spatial and/or temporal relationship of said focus volumes (F) of said sub-pulses originating from a common primary laser pulse is adjusted such that said focus volumes (F) of all sub-pulses originating from a common primary laser pulse are located within said region determined, said sub-pulses originating from a common primary laser pulse arrive at their respective foci (F) with a temporal difference of no more than 3 nanoseconds, an adjustment device (12, 8) is provided for adjusting said mutual spatial and/or temporal relationship of said focus volumes (F) of said sub-pulses originating from a common primary laser pulse and the adjustment device (8, 12) comprises at least one first degree of freedom to adjust said spatial relationship of a first sub-pulse to a second sub-pulse, in order to thereby determine a group of focus volumes (F) of two sub-pulses.

18. The method according to claim 17, characterized in that the size of said focus volumes (F) of said individual sub-pulses is additionally adjusted such that said group of said sub-pulses originating from a common primary laser pulse connect with each other or at least partially overlap.

19. The method according to claim 17, characterized in that the size of said focus volumes (F) of said sub-pulses is adjusted such that said predetermined two-dimensional or three-dimensional region is illuminated or swept over as uniformly as possible.

20. The method according to claim 17, characterized in that a surface in or on said object corresponding to that of a pixel is illuminated at least substantially uniformly during the pixel-integration time by said sub-pulses originating from a common primary laser pulse.

21. The method according to claim 20, characterized in that a change of the pixel size automatically results in a corresponding change in the size of said two-dimensional or three-dimensional region illuminated within or on said object by said group of sub-pulses.

22. The method according to claim 17, characterized in that a predetermined partial region of said object is scanned by scanning a group of focus volumes of sub-pulses across said predetermined partial region.

* * * * *